(12) United States Patent
Bader et al.

(10) Patent No.: US 11,077,875 B2
(45) Date of Patent: Aug. 3, 2021

(54) RACK AND A METHOD FOR PRODUCING A RACK FOR A STEERING GEAR OF A MOTOR VEHICLE

(71) Applicants: THYSSENKRUPP PRESTA AG, Eschen (LI); thyssenkrupp AG, Essen (DE)

(72) Inventors: Reinhard Bader, Satteins (AT); Markus Mages, Nüziders (AT); Ralf Eckstein, Mauren (LI); Juergen Dohmann, Magdeburg (DE); René Feuerstein, Zwischenwasser Muntlix (AT)

(73) Assignees: THYSSENKRUPP PRESTA AG, Eschen (LI); thyssenkrupp AG, Essen (DE)

( * ) Notice: Subject to any disclaimer, the term of this patent is extended or adjusted under 35 U.S.C. 154(b) by 64 days.

(21) Appl. No.: 16/315,981

(22) PCT Filed: Jul. 4, 2017

(86) PCT No.: PCT/EP2017/066625
§ 371 (c)(1),
(2) Date: Jan. 7, 2019

(87) PCT Pub. No.: WO2018/007379
PCT Pub. Date: Jan. 11, 2018

(65) Prior Publication Data
US 2019/0232998 A1    Aug. 1, 2019

(30) Foreign Application Priority Data
Jul. 6, 2016 (DE) ..................... 10 2016 212 303.3

(51) Int. Cl.
*B62D 3/12* (2006.01)
*B21K 1/76* (2006.01)

(52) U.S. Cl.
CPC ................ *B62D 3/126* (2013.01); *B21K 1/76* (2013.01); *B21K 1/767* (2013.01)

(58) Field of Classification Search
CPC ............................... B21K 1/767; B21K 1/768
See application file for complete search history.

(56) References Cited

U.S. PATENT DOCUMENTS 3,337,108 A   8/1967   Taylor
3,472,996 A   10/1969  Braid
(Continued)

FOREIGN PATENT DOCUMENTS

CN   2 508 888 Y   9/2002
CN   1845844 A     10/2006
(Continued)

OTHER PUBLICATIONS

Machine translation of WO-2014037579-A1 (Year: 2014).*
(Continued)

*Primary Examiner* — Randell J Krug
(74) *Attorney, Agent, or Firm* — thyssenkrupp North America LLC

(57) ABSTRACT

A rack for a steering gear includes a toothed portion with a toothing extending along a longitudinal axis, and a generally cylinder-segment-shaped back opposite the toothing and having a back radius. A method for producing such a rack includes forming a cylindrical blank with an unmachined radius between a toothed die part having a toothed mold clearance and a back die part having a back mold clearance in a die cavity. The die may have a generally cylinder-segment-shape. In an open position of the die, the blank may be inserted between the toothed mold clearance and the back mold clearance. The toothed die part and the back die part in a forging stroke for closing the cavity may then be moved in a closing direction to a closed position. The back radius
(Continued)

Section X1-X1 of the back mold clearance may be larger than the unmachined radius of the blank.

10 Claims, 8 Drawing Sheets

(56) References Cited

U.S. PATENT DOCUMENTS

| | | | |
|---|---|---|---|
| 3,609,854 A | 10/1971 | Hasui | |
| 4,193,722 A | 3/1980 | Bishop | |
| 5,473,960 A | 12/1995 | Sakamoto | |
| 5,858,142 A | 1/1999 | Tully | |
| 6,706,127 B1 | 3/2004 | Duggirala | |
| 6,925,899 B2 | 8/2005 | Ozeki | |
| 7,225,541 B2* | 6/2007 | Kubota | B21K 1/767 29/897.2 |
| 7,654,165 B2 | 2/2010 | Roeske | |
| 8,104,369 B2* | 1/2012 | Yamawaki | B62D 3/126 74/422 |
| 9,139,221 B2 | 9/2015 | Takai | |
| 9,149,860 B2* | 10/2015 | Dohmann | B21J 13/02 |
| 9,694,843 B2 | 7/2017 | Taoka | |
| 10,562,138 B2 | 2/2020 | Nomura | |
| 10,612,642 B2 | 4/2020 | Yamawaki | |
| 2003/0097894 A1 | 5/2003 | Ozeki | |
| 2004/0104067 A1 | 6/2004 | Fishbach | |
| 2004/0256439 A1 | 12/2004 | Pfeiler | |
| 2005/0115298 A1* | 6/2005 | Brenner | B21K 1/767 72/370.21 |
| 2005/0255927 A1 | 11/2005 | Michioka | |
| 2006/0016238 A1 | 1/2006 | Shiokawa | |
| 2007/0051776 A1 | 3/2007 | Estes | |
| 2007/0057479 A1 | 3/2007 | Wolf | |
| 2007/0137343 A1 | 6/2007 | Roeske | |
| 2007/0204668 A1 | 9/2007 | Shiokawa | |
| 2008/0127762 A1 | 6/2008 | Baxter | |
| 2009/0200356 A1 | 8/2009 | Kawaura | |
| 2009/0242613 A1 | 10/2009 | Kawaura | |
| 2009/0260467 A1 | 10/2009 | Kobayashi | |
| 2010/0038167 A1 | 2/2010 | Bilmayer | |
| 2010/0052280 A1 | 3/2010 | Bilmayer | |
| 2010/0162843 A1 | 7/2010 | Kobayashi | |
| 2010/0206861 A1 | 8/2010 | Rudolph | |
| 2012/0018608 A1 | 1/2012 | Nishide | |
| 2012/0186085 A1 | 7/2012 | Kobayashi | |
| 2012/0258329 A1 | 10/2012 | Tanabe | |
| 2014/0060956 A1 | 3/2014 | Takai | |
| 2015/0239872 A1 | 8/2015 | McGowan | |
| 2015/0276037 A1 | 10/2015 | Yamawaki | |
| 2015/0298721 A1 | 10/2015 | Suzuki | |
| 2017/0203781 A1 | 7/2017 | Kato | |
| 2018/0031104 A1 | 2/2018 | Yamawaki | |
| 2018/0221938 A1 | 8/2018 | Mizutani | |
| 2018/0304422 A1 | 10/2018 | Nomura | |
| 2018/0306303 A1 | 10/2018 | Inagaki | |
| 2020/0009643 A1 | 1/2020 | Goto | |
| 2020/0056693 A1 | 2/2020 | Yamawaki | |

FOREIGN PATENT DOCUMENTS

| | | | |
|---|---|---|---|
| CN | 1856377 A | 11/2006 | |
| CN | 101549436 A | 10/2009 | |
| DE | 28 16 222 A | 10/1979 | |
| DE | 103 45 042 B | 12/2004 | |
| DE | 10330188 A | 2/2005 | |
| DE | 10 2004 049 365 A | 4/2006 | |
| DE | 10 2005 010 814 B | 7/2006 | |
| DE | 10 2007 018 919 A | 10/2008 | |
| DE | 10 2010 036 609 A | 1/2012 | |
| DE | 10 2010 055 165 A | 6/2012 | |
| DE | 10 2011 000 741 A | 8/2012 | |
| DE | 10 2012 011 509 A | 12/2013 | |
| DE | 10 2013 007 072 A | 3/2014 | |
| EP | 0 686 455 A | 12/1995 | |
| EP | 1 316 492 A | 6/2003 | |
| EP | 1469959 B | 10/2004 | |
| EP | 1946865 A | 7/2008 | |
| EP | 2 937 265 A | 10/2015 | |
| JP | S59104237 A | 6/1984 | |
| JP | 2006-46423 A | 9/2007 | |
| WO | 2005/053875 A | 6/2005 | |
| WO | WO-2005053875 A1 * | 6/2005 | B21J 5/12 |
| WO | 2006/066309 A | 6/2006 | |
| WO | 2006/094479 A | 9/2006 | |
| WO | 2008138033 A | 11/2008 | |
| WO | WO-2008138033 A1 * | 11/2008 | B62D 3/126 |
| WO | 2009/052552 A | 4/2009 | |
| WO | 2012/110307 A | 8/2012 | |
| WO | 2014037579 A | 3/2014 | |
| WO | WO-2014037579 A1 * | 3/2014 | F16H 55/26 |
| WO | 2014/104410 A | 7/2014 | |
| WO | 2014196617 A | 12/2014 | |

OTHER PUBLICATIONS

DIN EN 10083-1, Steels for quenching and tempering—Part 1: General technical delivery conditions, pp. 1-27, Oct. 2006.
DIN EN 10083-2, Steels for quenching and tempering—Part 2: Technical delivery conditions for non alloy steels, pp. 1-39, Oct. 2006.
DIN EN 10083-3, Steels for quenching and tempering—Part 3: Technical delivery conditions for alloy steels, pp. 1-58, Jan. 2007.
English Translation of International Search Report issued in PCT/EP2017/066625, dated Oct. 16, 2017.
DIN EN 10083 [[In the process of locating copy]].

* cited by examiner

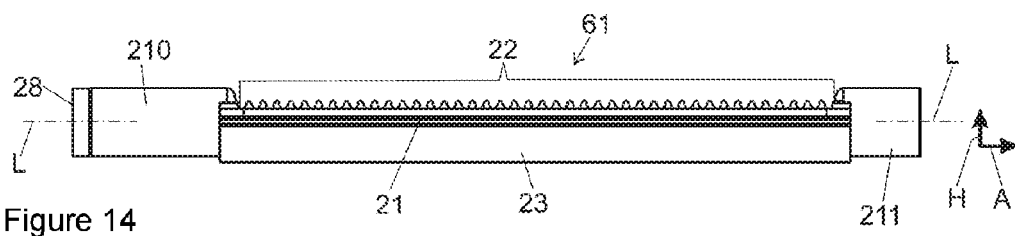
Figure 14
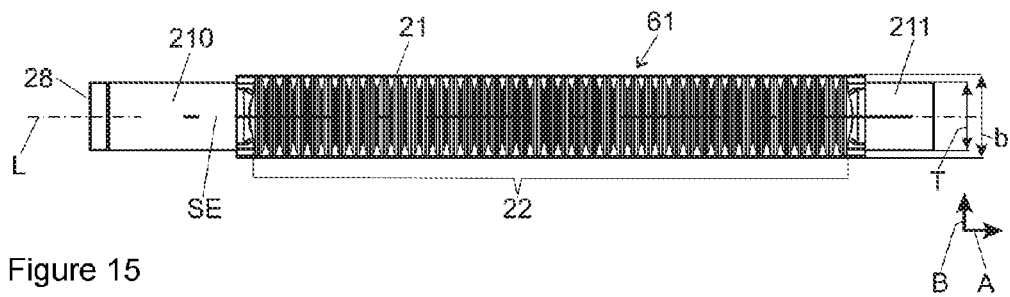
Figure 15
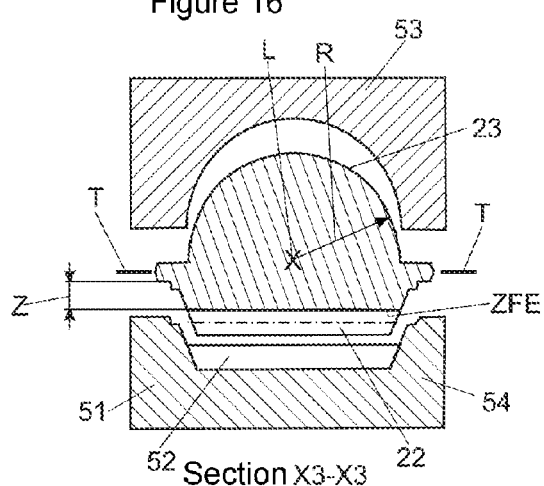
Section X1-X1
Figure 16
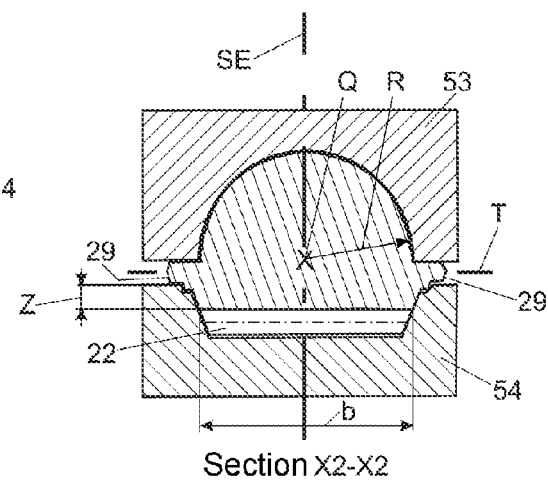
Section X2-X2
Figure 17
Section X3-X3
Figure 18
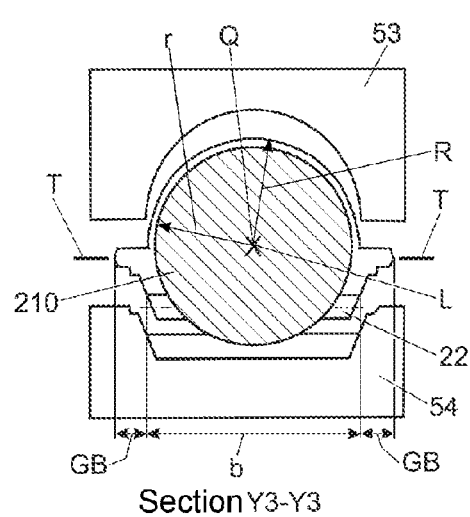
Section Y3-Y3
Figure 19

Section C-C

Section D-D

RACK AND A METHOD FOR PRODUCING A RACK FOR A STEERING GEAR OF A MOTOR VEHICLE

CROSS REFERENCE TO RELATED APPLICATIONS

This application is a U.S. National Stage Entry of International Patent Application Serial Number PCT/EP2017/066625, filed Jul. 4, 2017, which claims priority to German Patent Application No. DE 10 2016 212 303.3, filed Jul. 6, 2016, the entire contents of both of which are incorporated herein by reference.

FIELD

The present disclosure generally relates to steering gears, including racks and methods for forming racks for steering gears of motor vehicles.

BACKGROUND

In a vehicle steering mechanism a steering command as a rotating movement is introduced by way of the steering wheel into the steering shaft, a pinion which meshes with a toothing of a rack in a steering gear being attached to said steering shaft. The rack is mounted in the steering gear so as to be displaceable in the axial direction, that is to say in the direction of the longitudinal axis of said rack, such that a rotation of the pinion is converted to a translatory movement of the rack in the axial longitudinal direction of the latter. Tie rods which are connected to the steering knuckles of the wheels to be steered are fastened to the rack, the translatory movement of the rack being converted to a steering movement at said wheels.

The rack has at least one toothed portion in which the toothing is configured for the engagement of the pinion in the longitudinal direction, i.e. in the direction of the longitudinal axis of the rack, across a predefined axial length, which is referred to as toothing length hereinbelow. The toothing, measured transversely to the longitudinal axis, has a toothing width. In order for high forces to be reliably transmitted from the pinion to the rack, a largest possible toothing width at a given material cross section of the rack is targeted.

The special construction mode of racks produced according to the generic method has a rack back, hereunder also referred to as back for short, which in relation to the longitudinal axis is diametrically opposite the toothing and which in relation to a back axis that is parallel with the longitudinal axis has a cylinder-segment shape, for example a shape that approximates a semi-cylinder. In the case of a back cross section that is shaped approximately as a semi-cylinder, this construction mode is also referred to as a D-shaped rack. The D-shape is characterized by the back radius thereof, which corresponds to the radius of the cross section of the cylindrical basic shape, that is to say of the envelope circle that encloses the back cross section. As an alternative to the D-shape, a V-shaped back in which the V-shaped leg faces form secants of the envelope circle is also possible. The V-leg faces converge toward the back. Here too, the back comprises a cylinder-segment-shaped portion, or can be enclosed by a cylinder-segment-shaped envelope circle.

The back has at least one bearing face on which the rack is mounted in the steering gear so as to be displaceable in the direction of the longitudinal axis. The bearing faces preferably lie on the D-shaped back face or the V-leg faces. A contact pressure force which is transverse to the longitudinal axis and which presses the toothing so as to engage on the pinion can be exerted by means of a contact pressure device on the rack by way of the back, or the bearing faces, respectively. The contact pressure force is transmitted in the radial direction onto the back by way of a compression piece. In the event of a movement of the rack the compression piece slides in the longitudinal direction on the back. A back radius that is as large as possible is targeted in order for a high local load to be avoided in the introduction of force.

Racks having a D-shaped cross section are usually made from a solid or hollow cylindrical rod-shaped raw material, from which blanks of the required length are cut off, said blanks being provided with the toothing in further processing steps. A commonplace forming method for forming the toothed portion is die forging which forms the generic type. The die for the generic production of racks has a mold cavity, also referred to as the cavity, which is delimited by mold clearances in die parts that are lie on both sides opposite the longitudinal axis, said mold clearances in the closed position in each case bearing on one another on a separation plane that is parallel with the longitudinal axis and enclosing a negative mold of the toothed portion. One of the die parts of the generic type has a mold clearance in the form of the toothing, a so-called toothed mold clearance, and therefore hereunder is referred to as the toothed die part, and a further die part which in relation to the longitudinal axis lies diametrically opposite the toothed die part has a mold clearance, a so-called back mold clearance, in the form of the rack back which in relation to the longitudinal axis lies diametrically opposite the toothing on the rack and which hereunder is referred to as the back die part. For forging, the die is first opened in that the toothed die part and the back die part are diverged perpendicularly to the separation plane, transversely to the longitudinal axis. The blank is then incorporated between the toothed mold clearance and the back mold clearance, and the die is impinged with the forging or pressing force, respectively, such that the die parts are converged until the die is closed. The material of the blank, usually steel or other metals that are capable of hot-forming or cold-forming, is plastically deformed herein and flows in the die until the mold clearances of the cavity are completely filled. On account thereof it is possible for a toothed portion having a predefined tooth geometry and back geometry to be economically made in one work step.

The radius or diameter, respectively, of the blank, referred to as the unmachined radius or the unmachined diameter, respectively, is usually predefined so as to correspond to the shaft diameter of the rack outside the toothed portion. As opposed to subtractive manufacturing methods, die forging has the advantage that a toothing width that is larger relative to the unmachined radius of the cylindrical blank is implementable on said blank, said larger toothing width being advantageous for an improved transmission of force from the pinion to the rack. This is achieved in forging in that the blank is radially compressed by the toothed die such that material in the toothed mold clearance flows in the width, that is to say transversely to the longitudinal axis in the direction of the toothing width.

Methods for D-shaped forging are described, for example, in DE 10 2010 036 609 A1 and WO 2005/053875 A1. The implementation of relatively large toothing widths is described therein. In order for the flow of material that is required in forming to be achieved, the dies have additional movable die parts or lateral rams, respectively, and are accordingly constructed in a complicated and complex manner. Moreover, the toothing width and the back radius are limited by the width of the cavity which corresponds to the diameter of the blank.

Thus a need exists for improved racks and manufacturing processes of racks, in particular to permit the forging of a toothing having optimized cross-sectional geometry with relatively low production outlay.

BRIEF DESCRIPTION OF THE FIGURES

FIG. 14 is a schematic side view of the finished toothed segment according to FIG. 13 that is transverse to a longitudinal direction, in a direction of a width of a toothing (in a direction of a toothing width).

FIG. 15 is a plan view of the finished toothed segment according to FIG. 13 (in a direction of a height) onto the example toothing, the view being transverse to a longitudinal direction.

FIG. 16 is a cross-sectional view across line X1-X1 through the example die according to FIG. 11.

FIG. 17 is a cross-sectional view across line X2-X2 through the example die according to FIG. 12.

FIG. 18 is a cross-sectional view across line X3-X3 through the example die according to FIG. 13.

FIG. 19 is a cross-sectional view across line Y3-Y3 through the example die according to FIG. 13.

DETAILED DESCRIPTION

Figure 1:
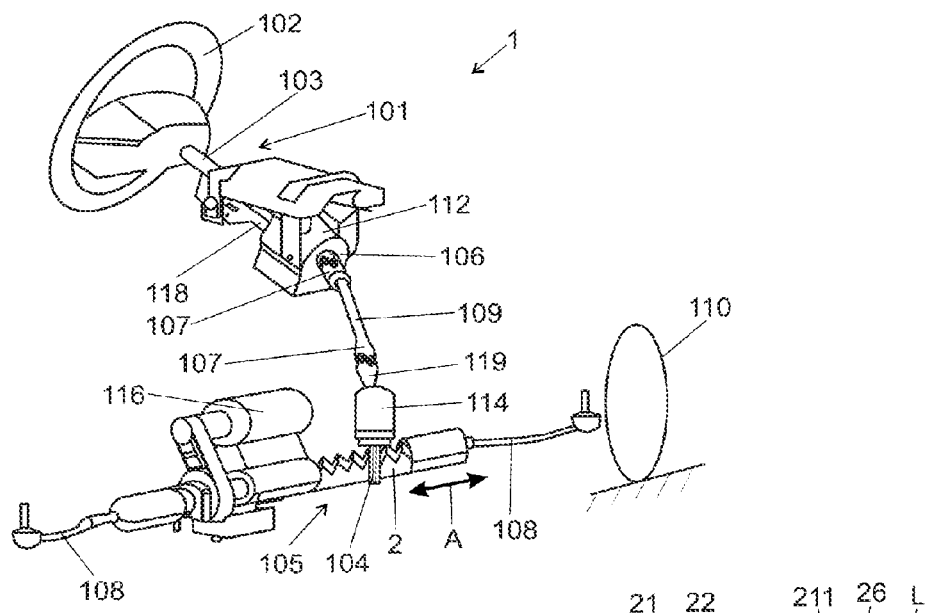
FIG. 1 is a schematic perspective view of an example steering system for a motor vehicle.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to methods for forming racks for steering gears of motor vehicles. In some examples, a rack may include a toothed portion with a toothing that extends along a longitudinal axis, and a back which at least in the basic shape thereof is cylinder-segment-shaped. The back may be arranged opposite the toothing and may have a back radius. In some example methods, a cylindrical blank having an unmachined radius may be formed between a toothed die part having a toothed mold clearance for forming the toothing and a back die part having a back mold clearance for forming the back in the cavity of a die that is split in a separation plane parallel with the longitudinal axis. The die may have a cylinder-segment-shaped basic shape having the back radius. The blank, in order to be formed, in an open position of the die may be inserted between the toothed mold clearance and the back mold clearance. The clearances may be mutually spaced apart relative to the separation plane. The toothed die part and the back die part, in a forging stroke for closing the cavity, may be subsequently converged to a closed position. The present disclosure furthermore relates to such racks for steering gears of motor vehicles, which may have a toothed portion with a toothing that extends along a longitudinal axis. The toothing may have a toothing width, and the toothed portion may have a freely formed burr having a burr width.

In order for the aforementioned set of issues to be solved, it is proposed according to the invention for the method mentioned at the outset that the back radius of the back mold clearance is larger than the unmachined radius of the blank. The unmachined radius of the blank herein is consistent across the entire length of the blank. A solid material is used as the blank.

The back radius of the back mold clearance is identical to the back radius of the toothed portion of the rack that is formed in the die. In the case of a D-shaped back, the back radius corresponds to the radius of the cylinder segment; in the case of a back that is V-shaped in the cross section, the back radius is the radius of an envelope circle that encloses the back cross section.

In the case of the method according to the invention a die having a back die part is used, the back mold clearance of said back die part having a cylinder-segment-shaped basic shape, the envelope circle of said basic shape being larger than the diameter of the blank, that is to say that the back radius is larger than the unmachined radius. The blank in forging is compressed in the direction of the forging stroke, this corresponding to the closing direction of the dies, by the toothed segment into the back segment to such an extent that the material in the back die flows transversely to the longitudinal axis and fills the width of the back mold clearance, said width being larger relative to the unmachined diameter. Accordingly, a back having a larger back radius which in particular is not limited by the diameter or the radius, respectively, of the blank is formed.

On account of the back radius that in forging is enlarged relative to the unmachined radius of the blank, and on account of the associated enlargement of the back width, a correspondingly larger width is available for the toothing on that side that is radially opposite the back and where the toothing is molded by the toothed die part. Consequently, a toothing width which is larger than the unmachined radius of the blank so as to correspond to the width of the toothing measured transversely to the longitudinal axis can be implemented on account of the design of the toothed mold clearance, said toothing likewise not being delimited by the diameter or the radius, respectively, of the blank.

The method according to the invention thus enables material and processing for severing a burr beside the toothing to be saved, said burr being created during the forming method in a manner corresponding to the prior art. Moreover, the production by way of the method according to the invention can be performed using a two-part die which is of a simpler construction than dies described in the prior art, said dies having, for example, movable lateral rams in addition to the toothed die part and the back die part. The production complexity is reduced on account thereof.

The method according to the invention can be utilized for producing racks in which the back is configured so as to be D-shaped, that is to say cylinder-segment-shaped. Accordingly, the back mold clearance in the back die is configured so as to be cylindrical, or cylinder-segment-shaped, respectively, having the back radius.

The production of racks in which the back in the cross-section is configured so as to be V-shaped can likewise be performed according to the method according to the invention. In order for the prism-shaped arrangement of the V-leg faces that lie at a mutual angle to be implemented, the back mold clearance is configured in a corresponding manner so as to be likewise V-shaped. The V-shaped cross section in which the V-leg faces are mutually adjacent in an edge that runs parallel with the longitudinal axis is enclosed by an envelope circle having the larger back radius according to the invention, such that the V-leg faces in the cross-section represent secants of the envelope circle. The back radius of the back mold clearance herein corresponds to the radius of the envelope circle which according to the invention is larger than the unmachined radius of the blank.

A larger back width which, when measured transversely to the longitudinal axis, is wider than the diameter that corresponds to twice the unmachined radius of the blank can be implemented by the method according to the invention both in the case of a D-shaped back as well as in the case of a V-shaped back or a back shaped so as to deviate therefrom. On account thereof, the bearing face of the rack in the steering gear can be designed so as to be correspondingly wider than in the prior art. The lower surface pressure on the bearing faces of the rack friction bearing in the longitudinal direction that is implementable on account thereof ensures an improved sliding behavior and lower wear. The fundamental advantages of a D-shaped or V-shaped back are further improved by way of the wider back of the rack according to the invention, wherein the material input remains the same and the forming effort is lower than in the forming methods described in the prior art.

A further advantage of the method according to the invention is that the forging force which is required for forming and by way of which the die parts are mutually compressed, can be lower than in the prior art in order for back width or toothing width, respectively, that is as large as possible to be generated. The forming of a blank having an unmachined radius which is smaller than the targeted back radius specifically requires a lower forging force than when the unmachined radius of the blank corresponds substantially already to the back radius. The manufacturing can be performed on smaller presses and in a more energy-efficient manner on account thereof.

When forming according to the method according to the invention it is advantageous for the blank to have at least one transition portion which is held in a holding installation. The blank is not formed in the transition portion which adjoins the toothed portion in the direction of the longitudinal axis, said blank retaining the round cross section thereof having the unmachined radius which is smaller than the back radius. Transition portions are preferably disposed in the longitudinal direction on both sides of the toothed portion. The holding installation encompasses in each case the transition portion and during forming ensures a reliable bracing of the blank in a coaxial manner on the longitudinal axis of the rack. The toothed portion by way of a cylindrical transition portion of this type can be connected to shaft, threaded, bearing, connection, or other functional portions of the rack, which can optionally be generated in downstream processing steps.

A refinement of the method provides that the back axis in the toothed region when forming is radially offset relative to the longitudinal axis, in the direction toward the back, by a predefined spacing. The back axis according to the definition runs through the center of the envelope circle, thus forming the axis of the part-cylindrical D-shaped back, or of the envelope cylinder that wraps a V-shaped back. The back axis is configured in the forming of the back and runs parallel with the longitudinal axis of the rack at the spacing which is also referred to as the offset, wherein the back axis in the radial direction is offset relative to the longitudinal axis, toward the side of the toothed portion. A higher resistance to bending of the rack is achieved on account thereof. On account of the reduced radial spacing from the back axis, a toothing that lies deeper in the cross section can be implemented than would be possible by way of the dies having lateral rams known in the prior art. The smaller axial spacing of a deeper toothing enables a relatively small envelope circle at a relatively large toothing width.

As a result, according to the invention a lighter rack having a higher load-bearing capability in terms of the introduction of force by the pinion and a higher resistance to bending can be made available at a lower production complexity, said rack on account of the wider back geometry enabling a better mounting in the steering gear.

The blank by means of the method according to the invention can be machined so as to configure a shaft portion that in the direction of the longitudinal axis adjoins the toothed portion in an integral manner. An integral rack in which the toothed portion is adjoined by one or a plurality of functional portions, for example a shaft portion having a threaded portion, or a further toothed portion for coupling-in an auxiliary force into the rack, can be produced from a blank in this way.

Alternatively, it is likewise possible that a toothed portion is configured on a toothed segment which is connected to at least one further functional segment. For so-called constructed racks, individual segments such as toothed segments, shaft segments, threaded segments and/or further functional segments, are first separately made and subsequently by means of suitable joining methods are joined in the longitudinal direction so as to form a rack. According to the invention a toothed segment is generated in that a segment blank is provided with a toothing and a back by means of a die according to the invention. The advantages of the method according to the invention can be utilized in a corresponding manner for producing a constructed rack.

The forming is preferably performed as hot forming, in particular as hot forging or warm forging. The blank herein is heated prior to being incorporated in the die, in the case of steel to a temperature of 750° C. to 1250° C. Advantages include an easier forming capability at lower forming forces. Alternatively, cold forming can also be performed, wherein tight dimensional tolerances and an improved material strength can be achieved.

It can be advantageous for a blank prior to forming to be machined in a continuous dimensionally accurate manner across the length of said blank, for example by subtractive or non-subtractive methods. For example, a circular cross sectional shape can be predefined in a sufficiently accurate manner by milling, peeling, grinding, drawing, rolling, or the like, such that a minor formation of burrs arises in forming and, accordingly, no post-machining or only minor post-machining is required, and the non-formed regions outside the toothing likewise do not have to be post-machined or post-machined only to a minor extent after forming, depending on the later function of said regions.

The object is further achieved by a rack for a steering gear of a motor vehicle, said rack comprising a toothed portion which has a toothing that extends along a longitudinal axis, wherein the toothing has a toothing width, and wherein the toothed portion has a freely formed burr having a burr width, the burr width being equal to or less than 25% of the toothing width.

The burr width is preferably equal to or less than 18% of, particularly preferably equal to or less than 10% of the toothing width. Burr widths of less than 5% of the toothing width are particularly preferable, said burr widths being able to be represented in a simple manner by way of the method according to the invention.

The rack, the toothing portion thereof extending along a longitudinal axis and said rack, opposite the toothed portion in relation to the longitudinal axis, having a cylinder-segment-shaped back having a back radius R, preferably furthermore comprises a transition portion, the radius r of said transition portion being smaller than the back radius R.

The burr width can preferably be configured so as to be larger than 0.5% of the toothing width.

FIG. 1 shows a schematic perspective illustration of a motor vehicle steering mechanism 1, wherein a torque as a steering torque can be introduced by the driver into a steering shaft 101 by way of a steering wheel 102. The steering torque is transmitted by way of the steering shaft 101 to a steering pinion 104 which meshes with a rack 2 which then in turn transmits the predefined steering angle to the steerable wheels 110 of the motor vehicle by way of respective tie rods 108. The steering pinion 104 conjointly with the rack 2 forms a steering gear 105. The steering gear 105 has a housing (not illustrated here) in which the steering pinion 104 is mounted so as to be rotatable and the rack 2 is mounted so as to be longitudinal displaceable in both directions in the longitudinal direction A, also referred to as the axial direction A, this being indicated by the double arrow.

An electric and/or hydraulic power assistance unit in the form of a power assistance unit 112, alternatively also a power assistance unit 114 or 116, respectively, can be coupled either to the steering shaft 1, to the steering pinion 104, or the rack 2, respectively. The respective power assistance unit 112, 114, or 116 introduces an auxiliary torque into the steering shaft 1, the steering pinion 104, and/or an auxiliary force into the rack 2, on account of which the driver is assisted in operating the steering. The three different power assistance units 112, 114, and 116, illustrated in FIG. 1, show alternative positions for the disposal of said power assistance units. Only a single one of the positions shown is usually occupied by a power assistance unit. The auxiliary torque or the auxiliary force for supporting the driver, which is to be applied by means of the respective power assistance unit 112, 114, or 116, is determined while taking into account the input torque detected by a torque sensor 118 which can be disposed in the power assistance unit 112 or 114.

The steering shaft 1 has an input shaft 103 that is connected to the steering wheel 102, and an output shaft 106 that is connected to the steering pinion 104.

The output shaft 106, by way of an articulated joint 107 which is configured as a universal joint or a cardan joint, is connected to a shaft 109 which forms an intermediate shaft of the steering shaft 101 and which, by way of a further articulated joint 107 of identical construction, is connected to an input shaft 119 of the steering gear 105.

Figure 2:
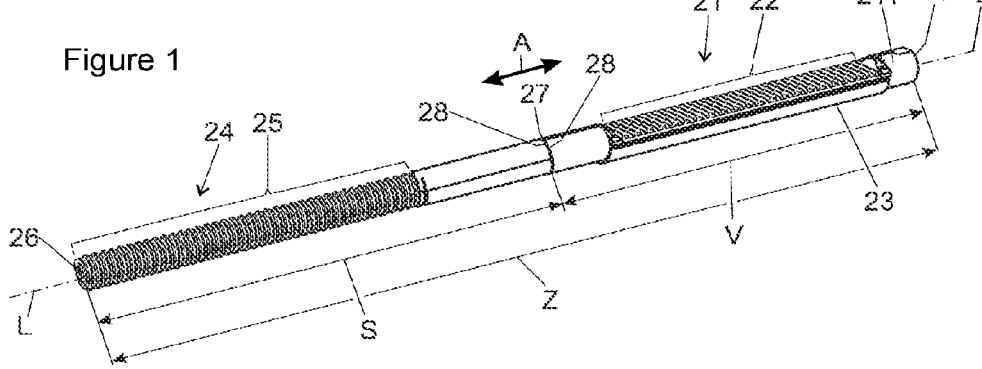
FIG. 2 is a perspective view of an example rack.

The rack 2 of the steering gear 105 is shown on its own in FIG. 2. It can be derived therefore that the rack 2 is configured so as to be bar-shaped and has a cylindrical basic shape which is elongate in the axial direction A and has a longitudinal axis L. The axial direction A in which the rack 2 is mounted so as to be longitudinally displaceable in the steering gear 105 lies so as to be parallel with the longitudinal axis L.

The rack 2 has a toothed portion 21 which on one side is provided with a toothing 22 which extends in the longitudinal direction A. That side that in relation to the longitudinal axis L is diametrically opposite the toothing is configured as a rack back 23 which hereunder is referred to for short as back 23.

The rack 2 furthermore has a shaft portion 24 which in the example shown in FIG. 2 has a thread 25 and is also referred to as the threaded portion 24. A spindle nut (not illustrated) is screw-fitted to the thread 25 in the steering gear 105, said spindle nut by the power assistance unit 116 being drivable so as to rotate about the longitudinal axis L, on account of which a force for supporting the steering can be applied to the rack 2 in the longitudinal direction A.

In order for a ball screw drive in which the spindle nut is configured as a recirculating ball nut to be formed, the thread 25 in terms of the thread profile and of the material properties can be optimized for the balls to roll, for example by hardening the steel from which the shaft portion 24 is made.

The toothed portion 21 and the shaft portion 24 have external free ends 26 which face away from one another in the longitudinal direction and which form the ends of the rack 2 where the tie rods 108 can be connected.

The rack 2 according to the invention is a constructed rack in which the toothed portion 21 having the toothing 22 and the shaft portion 24 having the thread 25, at the ends thereof that face one another in the axial direction by way of the end faces of said toothed portion 21 and of said shaft portion 24, hereunder referred to as joining faces 28, are connected to one another, for example by welding methods such as friction welding, in a joint 27.

The rack 2 in the finished state shown in FIG. 2, when measured along the longitudinal axis L, has a length Z which is composed of the shaft portion length S and of the toothed portion length V, in each case measured from the free end 26 up to the joint 27. The toothed portion 21 and the shaft portion 24 can preferably be made from a solid material.

By virtue of the configuration of the rack 2 from individual segments it is possible for the diameters of the unmachined parts for the shaft portion and the toothed portion to be conceived so as to be different. On account thereof, savings in terms of material can also be achieved without the use of hollow unmachined materials (tubes).

The shaft portion and the toothed portion are advantageously formed from a solid material since the initial product is more cost-effective, the manufacturing is simpler, and the post-machining, including hardening, is associated with fewer risks.

Furthermore, by virtue of the configuration of the rack from individual segments, the toothed portion and the shaft portion can be formed from different materials. For example, the toothed portion is preferably formed from the steel types SAE1040 or 37CrS4 according to DIN EN 10083, and the shaft portion is preferably formed from the heat-treatable steel C45 according to DIN EN 10083.

In order for a constructed rack 2 to be produced, prefabricated segments first have to be provided which subsequently by way of the joining faces 28 thereof are joined together at the joint 27. It will be explained hereunder how the production of a constructed rack 2 by way of the method according to the invention can be performed particularly economically by way of machining the segments according to the invention.

The production of a segment is performed to as to proceed from an unmachined segment material piece 3 which for short is also referred to as the unmachined material piece 3, or with a view to the further intended use is referred to, for example, as the unmachined shaft material piece or the unmachined toothed material piece. An unmachined material piece 3 can be provided as bar material, for example having a round cross section, for example from rolled or extruded steel. The piece length G of the unmachined material piece 3 can in principle be of arbitrary size; piece lengths G in the range from 2 m to 10 m are offered at a diameter in the magnitude from 20 to 40 mm in practice. This is a multiple of the length Z of a rack 2, or of the length S of a shaft portion 24, or of the length V of a toothed portion 21, respectively, said lengths being between approximately 0.1 m and 0.5 m.

Figure 3:
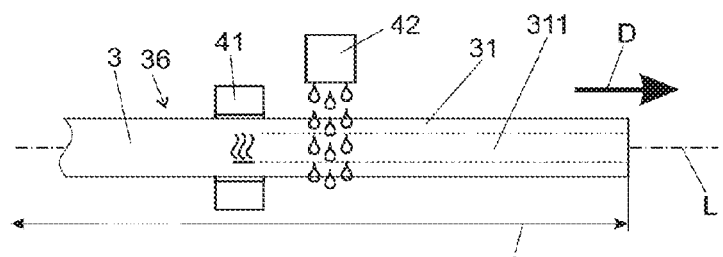
FIG. 3 is a schematic view of an example shaft semi-finished segment product in continuous hardening.

When particular requirements are set for the material hardness, hardened steel is used for producing the shaft portion or the toothed portion. Hardening according to the invention can be performed as is schematically illustrated in FIG. 3. An unmachined material piece 3 from hardenable steel, for example an unmachined shaft material piece, is provided and is aligned on the longitudinal axis L. Said unmachined material piece 3 is moved longitudinally in the processing direction D so as to be parallel with the longitudinal axis L, as is indicated by the arrow in FIG. 3. Said unmachined material piece 3 herein is guided through a continuous heating installation 41, for example through the coil assembly of an induction heating device. Continuous heating is performed in the continuous heating installation 41, wherein the steel is heated beyond the austenitizing temperature thereof. A continuous cooling installation 42 adjoins in the processing direction D, the heated unmachined material piece 3 likewise being moved continuously through said continuous cooling installation 42. Controlled continuous cooling is performed herein by a gaseous and/or liquid cooling fluid, for example, on account of which the steel is hardened, continuous hardening consequently being implemented. The process parameters such as temperatures as well as heating and cooling periods and rates are predefined so as to depend on the steel type used and on the material properties targeted by the hardening. A hardened semi-finished segment product 31 is available after continuous cooling in the continuous cooling installation 42, said hardened semi-finished segment product 31 being able to be fed to further processing steps. The semi-finished segment product after the hardening operation preferably has a cylindrical core region 311 which in relation to the initial material of the unmachined material piece 3 has not been imparted any hardness increase, as is illustrated in the example of FIG. 3.

An advantage of continuous hardening is that a hardened shaft semi-finished segment product 31 is provided, which has substantially the piece length G of the unmachined material piece 3, said piece length G corresponding to a multiple of the length Z of the rack or of the shaft portion length S or of the toothed portion length V, respectively. On account thereof, a more economical manufacturing can be performed than in the prior art, it being commonplace in the latter for the unmachined material prior to hardening to be cut to the length of one segment length Is.

Figure 9:
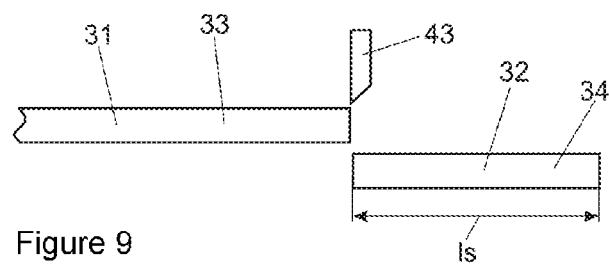
FIG. 9 is a schematic view of an example toothed segment blank being cut to length from a toothed semi-finished segment product according to FIG. 7 or FIG. 8.

By means of a separation installation 43, hardened segments 32 which have a segment length Is can be cut to length in a simple manner from the hardened shaft semi-finished segment product 31 which has the piece length G. This is schematically illustrated in FIG. 9. On account of the piece length G being a multiple of the segment length Is of a hardened segment 32, a correspondingly large number of segments 32 can be generated economically. The hardened segments 32 can be connected to further segments or be used as segment blanks which in further processing steps can be machined according to the intended use of said segments, for example as shaft segments, connection segments, or other functional segments.

In order for a rack 2 to be produced, it can be necessary for a segment having a high dimensional accuracy in the profile to be provided. The grinding of segment blanks which have already been shortened to the segment length Is, as is commonplace in the prior art, is tedious and complex.

Figure 4:
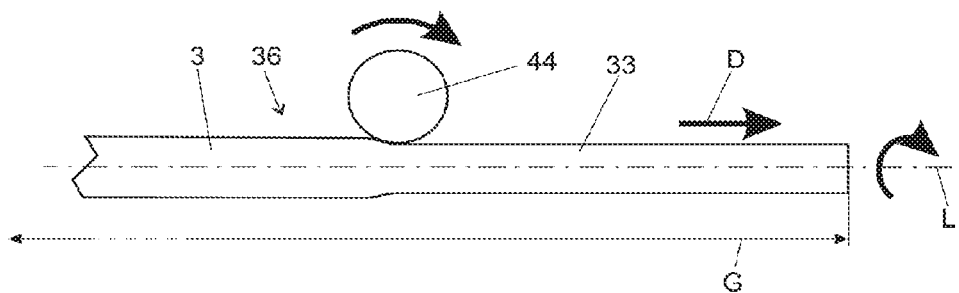
FIG. 4 is a schematic view of an example shaft semi-finished segment product in continuous grinding.

In order for the production to be designed so as to be more economical, the method according to invention which is schematically illustrated in FIG. 4 is proposed. An unmachined shaft material piece 3 which has a piece length G, for example one unmachined shaft material piece, is provided herein and is aligned on the longitudinal axis L. Said unmachined shaft material piece 3 is moved longitudinally in the processing direction D so as to be parallel with the longitudinal axis L, as is indicated by the arrow in FIG. 4. Said unmachined shaft material piece 3 herein is guided through a continuous grinding installation 44 while said unmachined shaft material piece 3 is rotated about the longitudinal axis L, as is indicated by the curved arrow. On account thereof, the unmachined material piece 3 across the entire piece length G thereof is continuously ground so as to be round in a dimensionally accurate manner by means of continuous grinding, said unmachined material piece 3 exiting the continuous grinding installation 44 in the processing direction D as a semi-finished segment product 33 ground in a dimensionally accurate manner.

The semi-finished segment product 33 ground in a dimensionally accurate manner has the same piece length G as the original unmachined material piece 3 that has been fed to continuous grinding. By means of a separation installation 43, such as has been illustrated in FIG. 9 for a hardened semi-finished segment product 31, segments 34 ground so as to be round in a dimensionally accurate manner can be cut to length in a simple manner from said ground semi-finished product 33. On account of the piece length G of the semi-finished segment product 33 being a multiple of the segment length Is of a ground segment 34, a correspondingly large number of segments 34 can be generated economically. The segments 34 can be used as segment blanks which in further processing steps can be machined according to the intended use of said segments, for example as shaft segments, connection segments, or other functional segments.

As an alternative to an unmachined segment material piece 3, it is conceivable and possible for a hardened semi-finished segment product 31 to be machined by continuous grounding according to the continuous hardening illustrated in FIG. 4. As a result, a hardened semi-finished segment product 33 ground in a dimensionally accurate manner having the piece length G is generated, from which a plurality of segments 34 can be economically cut to length.

Figure 5:
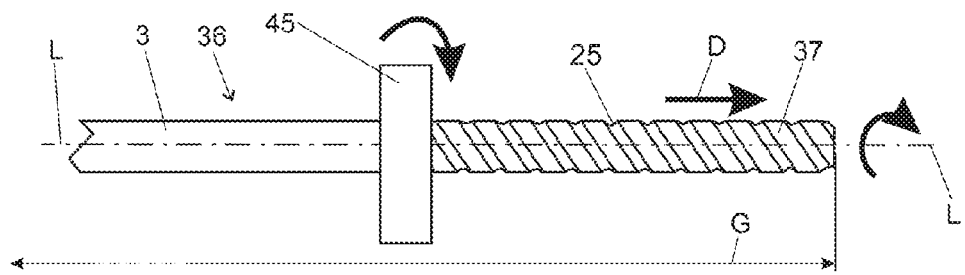
FIG. 5 is a schematic view of an example shaft semi-finished segment product when swirling for producing a threaded semi-finished product.
Figure 6:
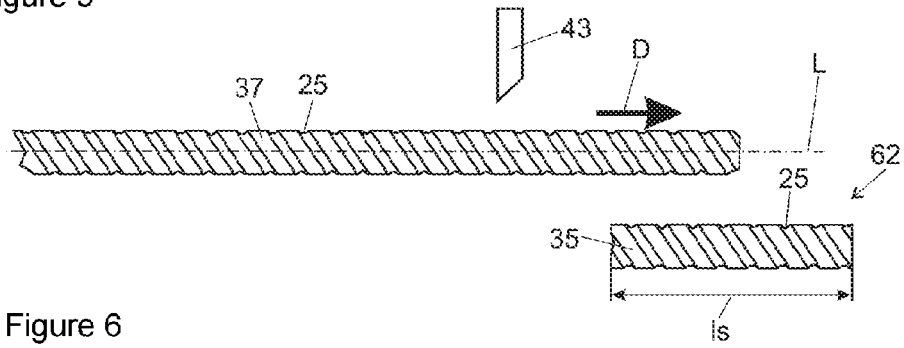
FIG. 6 is a cross-sectional schematic view of an example threaded segment being cut to length from a threaded semi-finished product according to FIG. 5.

It is schematically illustrated in FIG. 5 and FIG. 6 how a shaft segment that is configured as a threaded segment 35 may be produced economically by one or more example methods of the present disclosure. To this end, an unmachined shaft material piece 36 which, as has been described for the preceding embodiments, has a piece length G which corresponds to a multiple of the shaft portion length S is provided. When a shaft portion 24 is configured as a threaded portion having a thread 25 that continues across the length of said shaft portion 24, the thread length in the axial direction A corresponds to the shaft portion length S.

A whirling installation 45 into which an unmachined segment material piece 3 having the piece length G is inserted in the processing direction D is illustrated in FIG. 5. A thread 25 which in the axial direction A extends continuously across the entire piece length G is progressively cut into the unmachined segment material piece 3 by means of a rapidly rotating whirling head, said unmachined segment material piece 3 moving in the processing direction D and herein rotating slowly in the whirling installation. A semi-finished threaded product 37 which has the same piece length G as the unmachined segment material piece 3 is generated by this thread whirling in the continuous method, also referred to as continuous whirling for short.

Threaded segments 35 which have in each case a segment length Is can in each case be cut to length from the semi-finished threaded product 37 by means of a separation installation 43. On account of the piece length G of the semi-finished threaded product 37 being a multiple of the segment length Is of the threaded segments 35, a correspondingly large number of threaded segments 35 can be generated economically. The threaded segments 35 can be connected to further segments, for example to a tooth segment, or be utilized as segment blanks which in further processing steps are machined according to the intended use of said segment blanks.

Figure 7:
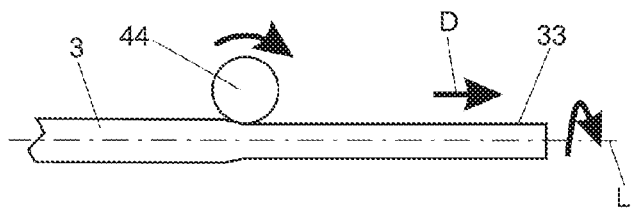
FIG. 7 is a schematic view of an example toothed portion semi-finished product in continuous grinding.
Figure 8:
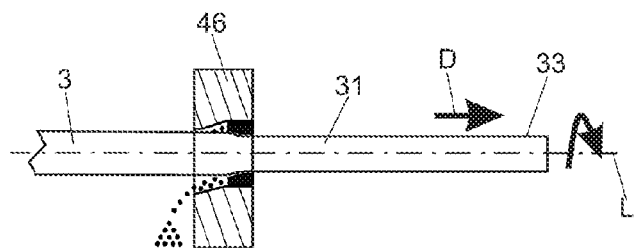
FIG. 8 is a schematic view of an example toothed portion semi-finished product in continuous peeling.

FIG. 7 shows how an unmachined segment material piece 3, for example for producing a toothed portion 21, can be ground to a round size across the entire piece length G of said unmachined segment material piece 3 in a continuous grinding procedure by means of a continuous grinding installation 44. Alternatively, it is possible for the unmachined segment material piece 3 to be likewise continuously machined to size across the entire piece length G of said unmachined segment material piece 3 by means of a peeling installation 46, as is illustrated in FIG. 8, so as to generate a dimensionally accurate semi-finished segment product 33. By contrast to the illustration of the unmachined shaft material pieces 3, unmachined toothed material pieces 32 are not hardened so as not to complicate any subsequent forming. Accordingly, the unmachined toothed material piece 32 is severed to the required length Is, preferably by means of sawing, directly after the machining by means of grinding (FIG. 7) or peeling (FIG. 8).

FIGS. 10 to 13 schematically show snapshots of a die 5 in successive steps of the method according to the invention. The view, that is to say the viewing direction, herein is transverse to the longitudinal axis L (the latter lying parallel with the longitudinal direction A) in the width direction B, perpendicular to the height direction H. The width direction B is defined by the direction which is aligned so as to be orthogonal to the end sectional plane SE of the toothing 22. The width direction B in the case of a spur toothing is defined by the direction in which the toothing 22 by way of the toothing width b extends transversely to the longitudinal axis L. The height direction H is defined by the radial direction which, in a manner perpendicular to the longitudinal axis L and perpendicular to the width direction B, runs perpendicularly from the back 23 through the toothing 22 of a rack 2.

The die 5 comprises a toothed die part 51 having a tooth mold clearance 52 which is formed as a negative impression of the toothing 22, and a rear die part 53 having a back mold clearance 54. The die 5 is separated in a separation plane T which in the width direction B runs parallel with the longitudinal axis L. The back mold clearance 54 is configured as the negative mold of the back 23 and as illustrated is shaped so as to be substantially semi-cylindrical, having a back radius R as can be clearly seen in the cross-sectional illustration of FIG. 6. It is likewise conceivable and possible for the back to have a Gothic cross-sectional profile, having two convexly curved portions which are at a mutual angle. Upper holding installations 55 (at the bottom in the illustration) are disposed in the longitudinal direction A, that is to say parallel with the longitudinal axis L, so as to neighbor the toothed die part 51 on both sides, and lower holding installations 56 (at the top in the illustration) are disposed so as to neighbor the back die part 53. A terminal detent 57 is disposed beside the holding installations 55, 56 on a side that in the longitudinal direction faces away from the die parts 52, 53.

In order for the method according to the invention to be carried out, a cylindrical unmachined segment material piece 3, hereunder also referred to as the blank 3 for short, having the segment length Iz, is provided, heated to the forging temperature of 750° C. to 250° C., depending on the method, and inserted into the toothed mold clearance 52 and the back mold clearance 53 which in the open position are spaced apart from one another. A defined radial fixing of the longitudinal axis L of the blank 3 relative to the die 5 is performed by clamping between the holding installations 55 and 56. The blank 3, by way of the free end 26, in the longitudinal direction A is brought to stop on the terminal detent 57, on account of which the blank 3 is axially positioned, that is to say positioned in the direction of the longitudinal axis L.

Figure 10:
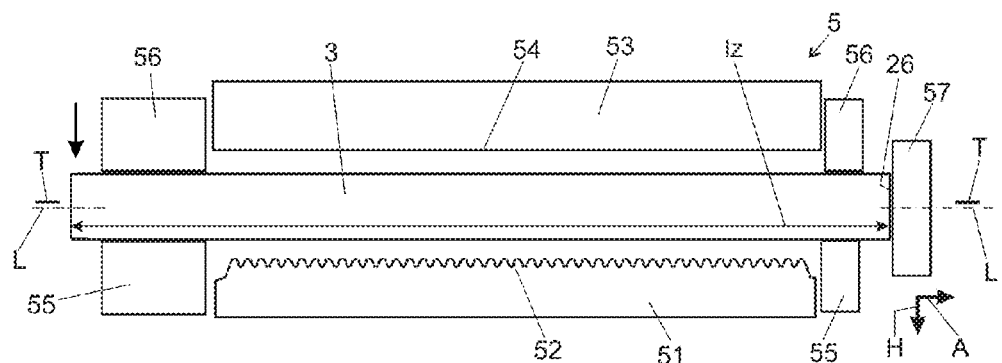
FIG. 10 is a schematic view transverse to a longitudinal axis of an example die in an open state, prior to forming.
Figure 11:
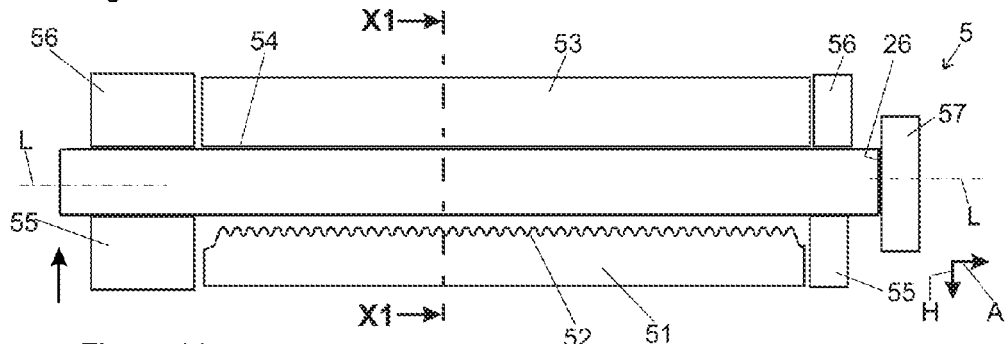
FIG. 11 is a schematic view of the die as in FIG. 10 in a subsequent method step, in a partially closed state.

The back die part 53 is moved from the open state according to FIG. 10 counter to the height direction H, as is indicated by the arrow in FIG. 10, until the back mold clearance 54 bears (from above in the drawings) on the rear side on the blank 3, as is illustrated in FIGS. 11 and 16. It can be derived from the sectional illustration of FIG. 16 that the cylindrical blank 3 has a blank radius r which, as required according to the invention, is smaller than the radius of the rear mold clearance 54, the back radius R. Accordingly, the back mold clearance 54 initially bears only in a linear manner on the external circumference in the back region of the blank 3. The back die part 53 is now located in the forging position.

Figure 12:
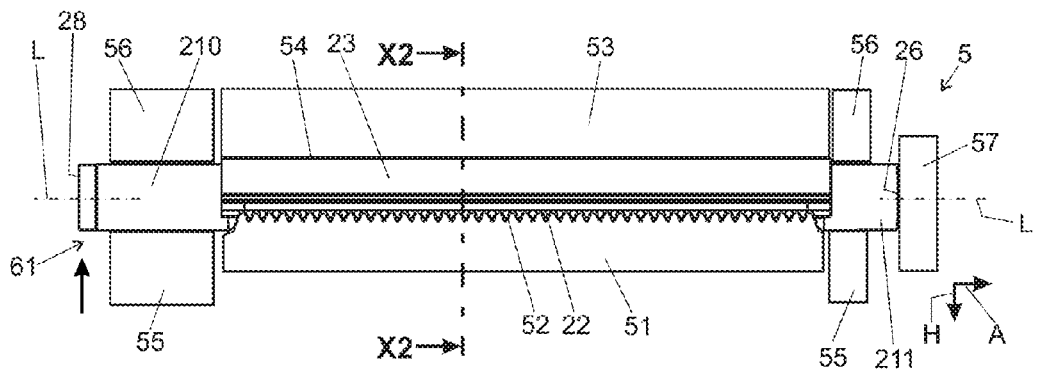
FIG. 12 is a schematic view of the die as in FIG. 11 in a subsequent method step, in a closed state.

The forging stroke is carried out in the next step, wherein the toothed die part 51 is moved in the height direction H (upward in the drawing), perpendicularly to the longitudinal axis L, toward the tooth-side of the blank 3, as is indicated by the arrow in FIGS. 11 and 12. The forming of the blank 3 is performed herein in that the material, preferably steel at the forging temperature, is plastically deformed, wherein the material flows and fills the cavity between the back die part 53 and the toothed die part 51. On account thereof, the back mold clearance 54 is impressed in the rear side in the blank 3, such that the back 23 having the back radius R is configured, and on that side that is opposite in relation to the longitudinal axis L the toothing 22 is impressed on the toothed side by the toothed mold clearance 51, such that the toothed portion 21 is configured. The blank 3 has in this way been formed to a toothed segment 61 which has a toothed portion 21 having the toothing 22 the back 23, as well as transition portions 210 and 211 that adjoin the toothed portion 21. The toothing 22 comprises a tooth root plane ZFE. The transition portions 210 and 211 have not been deformed in the forging and thus retain the same blank radius r and the longitudinal axis L as the blank 3. The joining face 28 where a shaft segment, for example in the form of a threaded segment 35, can be joined is located at the end side at the free end of the transition portion 210.

The terminal position of the forging stroke is shown in the cross section in FIG. 17 in the cross section X2-X2 through the toothed portion 21. It can be seen herein that the compression in the height direction H, perpendicular to the longitudinal axis L, when forging is so large that material in the toothed portion 21 between the toothed die part 51 and the back die part 53 in the separation T is squeezed out laterally in the width direction B, while forming burrs 29 protruding from the width B having a burr width GB in relation to the longitudinal axis L. The burrs 29 are spaced apart from the tooth root plane ZFE at a burr spacing Z in the height direction H. The burr spacing Z is the smallest spacing, measured in the height direction H, between the tooth root plane ZFE and the peripheral region of the respective burr 29. The peripheral region of the respective burr 29 is formed by the freely formed region. In order for the toothing 22 to be particularly positively configured when forming, the burr spacing Z preferably has a value which is smaller than 20% of the back radius R. The burr spacing Z particularly preferably has a value which is smaller than 15% of the back radius R. The burr spacing Z most preferably has a value which is smaller than 5% of the back radius R. On account of the freely formed burrs being configured close to the tooth root plane ZFE, an improved flow behavior in forming and an improved configuration of the structure of the toothing 22 can be achieved.

The back radius R in the toothed portion 21 defines a back axis Q around which the back 23 by way of the semi-cylindrical or partially cylindrical, respectively, shape thereof extends in a coaxial manner. On account of the compression caused in forming and the flowing in the width direction B associated with the former, the back when measured in the width direction B is imparted a back width (2×R) that corresponds to double the back radius R. The toothing 22 that is opposite the back 23 on account of forming is imparted a toothing width b in the width direction B. A utilizable toothing width b, also referred to as the tooth root width, which corresponds substantially to the back width (2×R) is preferably generated. An optimal radial support of the toothing 22 by the back 23 is performed and a high flexural resistance is implemented on account thereof.

Thanks to the method according to the invention, both the back width (2×R) as well as the toothing width b can be larger than the unmachined diameter (2×r) of the blank 3, said unmachined diameter (2×r) corresponding to double the unmachined radius. The introduction of force from the steering pinion 104 into the toothing 22 is improved on account thereof. Moreover, an optimized mounting of the back 23 in the steering gear 105 can be implemented, said back 23 being widened relative to the blank 3.

Figure 13:
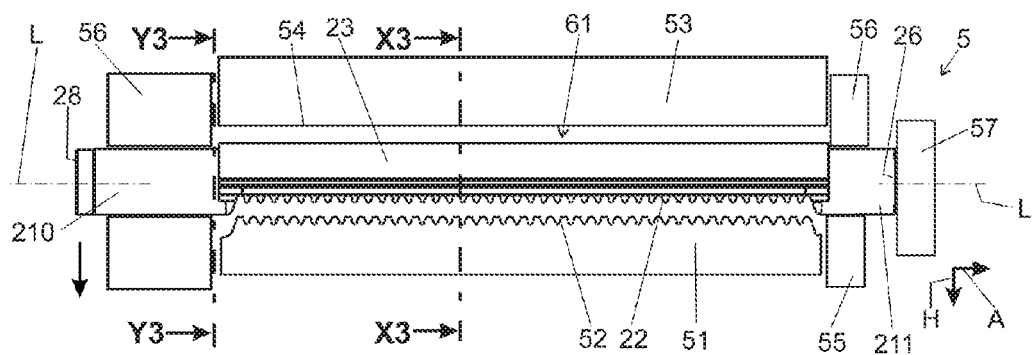
FIG. 13 is a schematic view of the die as in FIG. 12 in a subsequent method step, in a reopened state, after forming.

After the forging stroke, the back die part 53 and the toothed die part 51 are again diverged in a reverse stroke movement that is opposite to the forging stroke, as is illustrated in FIG. 13 and indicated by the arrows. The die 5 is again opened on account thereof, as is shown in FIG. 10. The finished toothed segment 61 can be removed from the die 5 in this position, and a new blank 3 can be inserted, as is illustrated in FIG. 10.

The finished toothed segment 61 in FIG. 14 is shown in a lateral view in the width direction B that is transverse to the longitudinal axis L, thus parallel with the toothing 22 in the direction of the toothing width b, and in FIG. 15 is shown in a plan view on the toothing 21 that is transverse to the longitudinal axis L, thus counter to the height direction H.

It can be derived from the cross section is shown in FIGS. 16 to 19, in particular from FIG. 19, that the longitudinal axis L which forms the axis of the blank 3 and, after forming, correspondingly forms the axis of the transition portion 210, is congruent with the back axis Q which by way of the back radius R is surrounded in a coaxial manner by the back 23. This coaxial arrangement can be clearly seen in FIG. 19. in that the unmachined radius r and the back radius R relate to the same axis L and Q, respectively.

Figure 20:
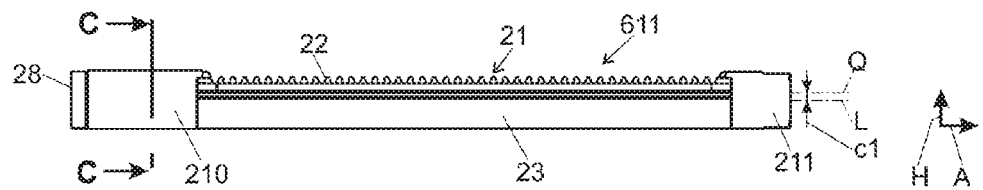
FIG. 20 is a schematic view of another example toothed segment analogous to that of FIG. 19, in a direction of a width of a toothing, the view being transverse to a longitudinal direction.
Figure 21:
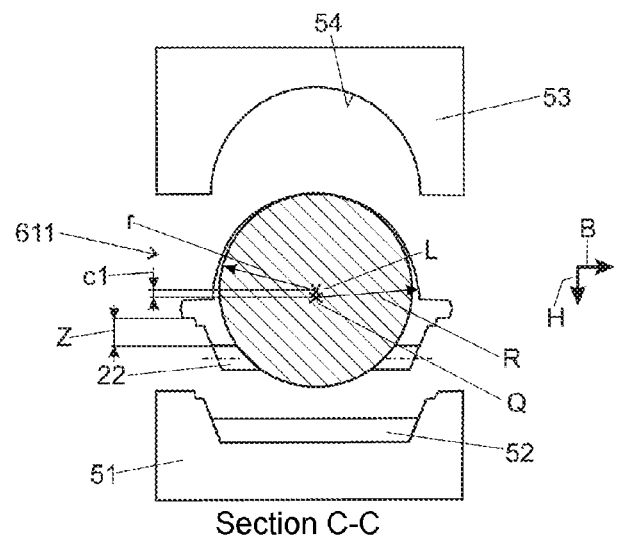
FIG. 21 is a cross-sectional view across line C-C through the example die according to FIG. 20.

A second embodiment of a toothed segment 611 according to the invention is illustrated in FIG. 20 in a lateral view corresponding to that of FIG. 14, and is illustrated in a section C-C through the transition portion 210 in a manner analogous to that of FIG. 19. As opposed to the toothed segment 61, the back axis Q herein in relation to the longitudinal axis L in a parallel manner is offset radially in the direction toward the toothing 21, specifically by a spacing c1 which is referred to as an offset. The offset c1 in the example shown corresponds to the difference between the radii R−r, is thus larger than zero, and can be referred to as a positive offset. The back 23, when viewed in the cross section, in the radial direction terminates at the lowermost point by way of the circumference of the transition portion 210. Accordingly, the toothing 22 in the radial direction is closer to the external circumference of the transition portion 210 by the difference (R−r), or in other words is molded less deeply into the cross section of the toothed segment 61 as is the case in the first embodiment according to FIG. 14.

Figure 22:
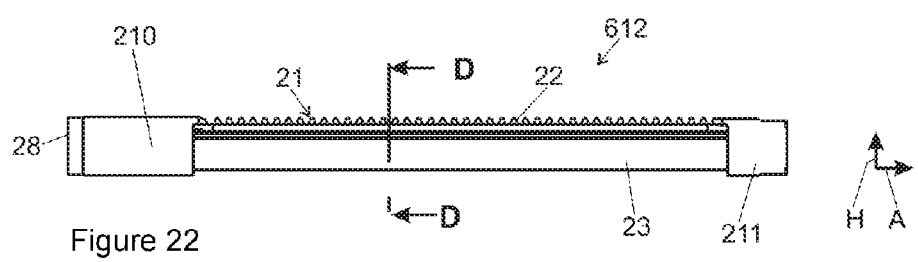
FIG. 22 is a side view of still another example toothed segment analogous to that of FIG. 19, in a direction of a width of a toothing, the view being transverse to a longitudinal direction.
Figure 23:
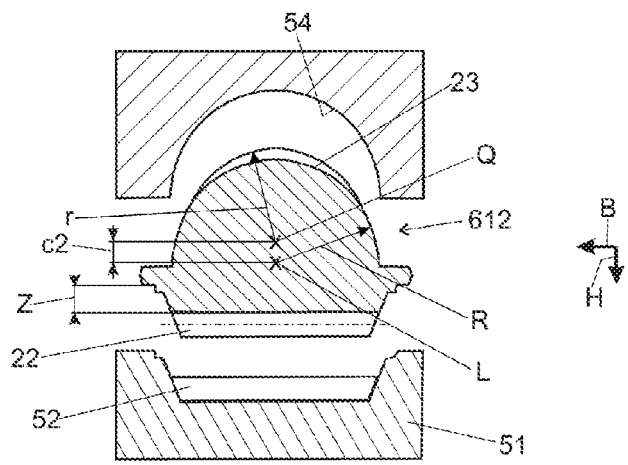
FIG. 23 is a cross-sectional view across line D-D through the example die according to FIG. 22.

A third embodiment of a toothed segment 612 according to the invention is illustrated in FIG. 22 in a lateral view corresponding to that of FIG. 14, and in FIG. 23 is illustrated in the section D-D through the toothed portion 21 in a manner analogous to that of FIG. 18. As is the case in the last-described embodiment of the toothed segment 611, the back axis Q is again offset in relation to the longitudinal axis L, specifically by a spacing or offset c2, respectively. The offset c2 in this embodiment is larger than the radii difference (R−r) such that the transition portion 210 in the cross section projects beyond the back 23, as can be seen in the sectional illustration of FIG. 23. The offset c2 in the example shown is chosen such that the toothing 22 in the height direction H terminates so as to be flush with the circumference of the transition portion 210. The toothing 22 in relation to the longitudinal axis L lies higher than in the case of the second embodiment of the toothed segment 611.

Thanks to the method according to the invention, an offset c1 or c2 can be implemented in a simple manner by a corresponding design of the die 5, if required. This can be achieved in detail in that the radial offset between the holding installations 55 and 56, which fix the position of the longitudinal axis L, and the toothed die part 51 and the back die part 53, which by way of the shaping of the back 23 determine the position of the back axis Q, is set according to the radii difference (R−r). In this way, the depth of the toothing 22 can be implemented so as to correspond to the respective requirements in the steering gear 105 by way of a die 5 that is of a relatively simple construction.

A further advantage of the method according to the invention also lies in that a rack can be implemented in particular also by way of less material input, because the radii difference does not cause any waste. The material input can be reduced on account thereof, even when the blank is formed from a solid material.

A rack for the steering gear of the motor vehicle is preferably implemented in this method, said rack having a toothed portion 21 which extends along the longitudinal axis L and, in relation to the longitudinal axis L, opposite the toothed portion 21 has a cylinder-segment-shaped back 23 having a back radius R, wherein a further cylindrical transition portion 201, 211 is configured on the toothed portion 21, the radius r of said further cylindrical transition portion 201, 211 being smaller than the back radius R. A radii difference in the range from 3% to 7% in relation to the back radius R is preferable. A radii difference particularly preferably lies in the range from 4.5% to 6.5%. Good shapings in the case of simultaneously advantageous material savings can be implemented herewith.

The method according to the invention offers yet a further significant advantage. A multiplicity of parameters must be adhered to in order for a rack which has a toothed portion illustrated in the example to be inserted into a steering gear. For example, the specified diameter of the rack is to be as small as possible in order for installation space to be saved. The burr width GB which is configured on both sides of the toothing width is in particular to remain limited. It is desirable here in that the mechanical post-processing is to be limited. In particular, the two burrs 29 by way of the method proposed can be implemented so as to have a respective burr width GB of less than 25% of the toothing width b, without any mechanical post-processing having to be performed. A respective burr width of less than 18% of the toothing width is preferable. Respective burr widths GB of less than 10%, or particularly preferably of at most 5%, of the toothing width b, can be achieved by optimizing the parameters in the tool. It is thus not necessary for the burrs 29 which in forming are created on both sides of the toothing to be removed, on account of which the mechanical post-processing of the toothed portion 21 can be reduced.

Figure 24:
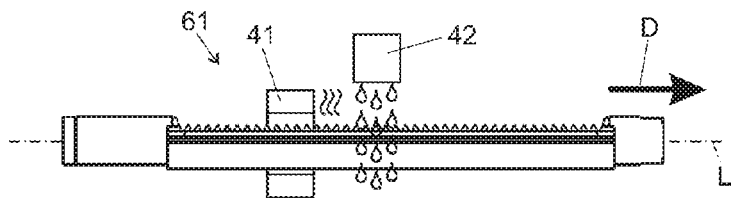
FIG. 24 is a schematic view of an example toothed segment in continuous hardening.

After forging, a toothed segment 61 (or 611 or 612, respectively) can be hardened in the continuous method, as is shown in FIG. 24. The toothed segment 61 herein is moved parallel with the longitudinal axis L through a continuous heating installation 41 and through a continuous cooling installation 42 that in the processing direction D is downstream of said continuous heating installation 41. The steel can be hardened by the corresponding choice of the thermal and temporal parameters, as has already been described in principle above in conjunction with FIG. 3 for a semi-finished shaft segment product 31. The optimal hardness for the stresses to be expected in operation can be set on account thereof.

Figure 32:
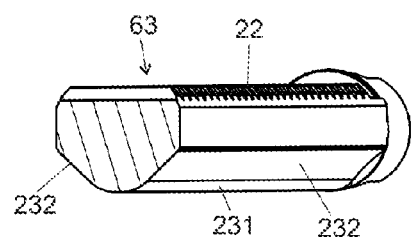
FIG. 32 is a perspective sectional view of the example rack according to FIG. 31.
Figure 33:
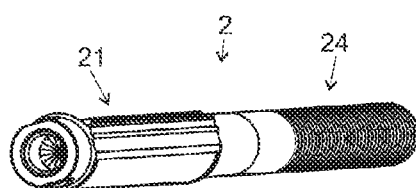
FIG. 33 is a perspective view of yet another example rack having a V-profile.

FIG. 32 shows a toothed segment 63 which has a V-shaped back 231, referred to as the V-back 231 for short. The V-shape is formed by two V-leg faces 232, which when seen from the toothing 22 converge at an angle toward the back 231.

Figure 35:
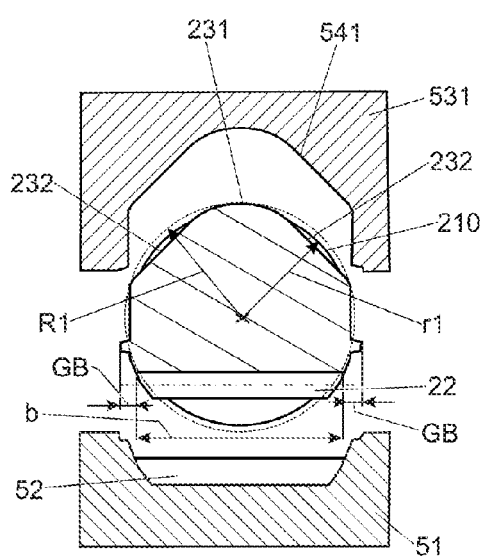
FIG. 35 is a cross-sectional view through the example die according to FIG. 34 after forging.

The V-back 231 in the cross section is enclosed by an envelope circle having the back radius R1, as can be derived from the sectional illustration of FIG. 35. The V-leg faces 232 comprise secants of the envelope circle which in FIG. 35 is drawn using dashed lines.

A transition portion 210 adjoins the toothing 22, as is the case in the D-shaped embodiment described above in conjunction with FIG. 10 to FIG. 24. The transition portion 210 has a radius r1 which corresponds to the unmachined radius r1 of the blank 3 according to FIG. 34.

Figure 34:
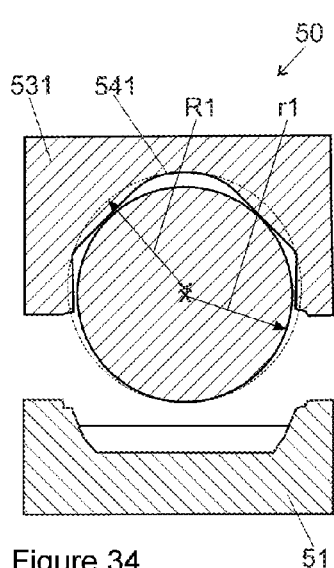
FIG. 34 is a cross-sectional view through an example die having an inserted semi-finished product prior to forging, in a manner analogous to FIG. 16.

The forging can be performed in a die 50 according to the method according to the invention, as is illustrated in the section in FIG. 34 in a manner analogous to that of FIG. 16, and is illustrated in FIG. 35 in a manner analogous to that of FIG. 18 or FIG. 23. The toothed die part 51 of the die 50 may be constructed as in the D-shaped embodiments of the die 5 described above. Deviating therefrom, the back die part 531 has a back mold clearance 541 that is V-shaped in the cross section.

It can be derived from FIG. 34 how a blank 3 having the unmachined radius r1 is inserted between the back die part 531 and the toothed die part 51. The envelope circle of the back mold clearance 541 having the back radius R1 is plotted using dashed lines. It can be seen that the blank 3 in the non-formed unmachined state, having the unmachined radius r1 is smaller as compared to the back radius R1, does not fill the die 5 in the width direction B, and that the blank 3 does not lie in a coaxial manner in the envelope circle.

FIG. 35 shows the finished toothed segment 63 forged from the blank 3. In this exemplary embodiment, the back 231, by way of the envelope circle thereof, and the transition portion 210 lie so as to be coaxial with the longitudinal axis L, that is to say that the radii r1 and R1 relate to the longitudinal axis L, as is the case in a D-shaped back 23 in the exemplary embodiment according to FIGS. 10 to 19. However, it is also conceivable and possible for an offset for a V-back 231 to be defined according to the requirements of the steering gear, as is the case in the embodiment according to FIGS. 20, 21, or FIGS. 22, 23.

Figure 31:
FIG. 31 is a perspective view of another example rack having a V-back.

FIGS. 31 and 32 show embodiments of racks 2 having different diameter conditions in the toothed portion 21 and the shaft portion 24, wherein the shaft portion 24 according to FIG. 31 has a larger diameter.

An advantage of the forging method according to the invention for producing a toothed segment 61, 611, 612, or 63 is that lower forging forces are required for forming a blank 3 having an unmachined radius r (or r1, respectively) that is smaller as compared to the back radius R (or R1, respectively), than in the case of the unmachined radius corresponding to the back radius, as in the prior art.

The same advantages in terms of the burr width and the conditions of the ratio of the back radius R1 to the unmachined radius r1 are derived in manner analogous to that as already discussed above in the context of the D-shaped back.

A rack for a steering gear of a motor vehicle is preferably implemented in this method, said rack having a toothed portion 21 which extends along the longitudinal axis L and, in relation to the longitudinal axis L, opposite the toothed portion 21 has a cylinder-segment-shaped back 23 having a back radius R1, wherein a further cylindrical transition portion 201, 211 is configured on the toothed portion 21, the radius r1 of said further cylindrical transition portion 201, 211 being smaller than the back radius R1. A radii difference preferably lies in the range from 3% to 7% in terms of the back radius R1. A radii difference in the range from 4.5% to 6.5% is particularly preferable.

The respective burr width GB having less than 25% of the toothing width b can also be implemented in this embodiment having the V-back, without any mechanical post-processing having to be performed. Accordingly, it is preferable also here for a respective burr width of less than 20% of the toothing width, or more preferably of less than 15%, or particularly preferably of at most 10%, of the toothing width b to be achieved.

Figure 25:
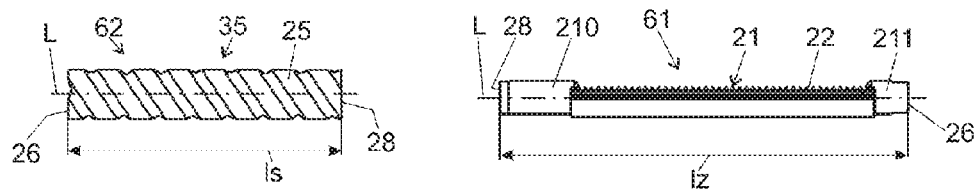
FIG. 25 is a schematic view of an example threaded segment and an example toothed segment prior to being clamped in a clamping device.
Figure 26:
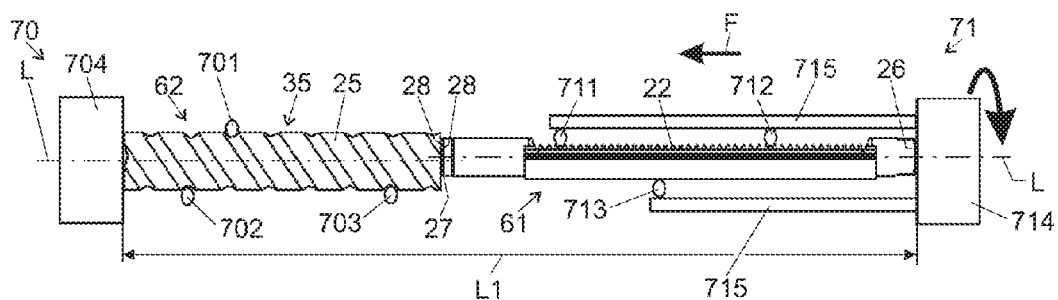
FIG. 26 is a schematic view of an example threaded segment and an example toothed segment in a clamping device prior to friction welding.
Figure 27:
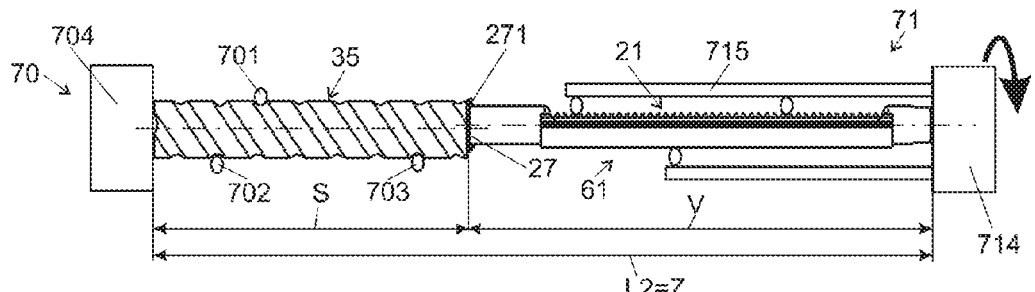
FIG. 27 is a schematic view of an example threaded segment and an example toothed segment in a clamping device after friction welding.

A method according to the invention for producing a rack 2 in which shaft segments, here a threaded segment 35, are joined to a toothed segment 61 by means of friction welding is illustrated in FIGS. 25 to 27.

The threaded segment 35 can be made as has been described above in conjunction with FIG. 5 and FIG. 6, for example. The threaded segment 35 in the direction of the longitudinal axis L has a segment length Is, and at one end side has a joining face 28.

The toothed segment 61 can be made available, for example by means of a method as has been described above by means of FIGS. 10 to 23, or FIGS. 36 to 40. The toothed segment 61 has a segment length Iz, and at one end side likewise has a joining face 28.

The threaded segment 35 is clamped in a clamping installation 70 and is aligned in a coaxial manner on the longitudinal axis L, as is illustrated in FIG. 26. The clamping installation 70 has clamping elements 701, 702, and 703, and a counter bearing 74. The clamping elements 701, 702, and 703 from the outside bear between the thread terms of the thread 25 in such a manner that a defined alignment is guaranteed on the longitudinal axis L. The thread 25 herein forms a reference face. The threaded segment 35 by way of the free end 26 thereof in the axial direction is supported on the counter bearing 704, on account of which a precise axial positioning in the direction of the longitudinal axis L is achieved.

The toothed segment 61 is clamped in a clamping installation 71 and is aligned in a coaxial manner on the longitudinal axis L. The clamping installation 71 has clamping elements 711, 712, and 713. The clamping elements 711 and 712 bear on the toothing 22; the clamping element 713 bears on the back 23. On account thereof, the functional faces of the toothing 22, or of the back 23, respectively, form reference faces which are precisely aligned on the longitudinal axis L.

The toothed segment 61 by way of the joining face 28 thereof bears on the joining face 28 of the threaded segment 35. The toothed segment 61 by way of the free end 26 thereof is supported in the axial direction on a compression piece 714 which by way of connection elements 715 is rigidly connected to the clamping elements 711, 712, and 713 of the clamping installation 71, and so as to be connected in a rotationally fixed manner relative to the longitudinal axis L.

The clamping installation 71 by a drive installation (not illustrated) is drivable so as to rotate about the longitudinal axis L, as is indicated by the curved arrow. A contact pressure force F in the direction of the longitudinal axis L can be exerted on the clamping installation 71 by means of a contact pressure installation (likewise not illustrated), as is indicated by the force arrow, and the joining face 28 of a clamped toothed segment 61 by way of said contact pressure force F being able to be pressed in an axial manner in the direction of the longitudinal axis L against the joining face 28 of the threaded segment 35 that is clamped in the clamping device 70. The joining faces 28 on account thereof are in frictional contact with one another.

The clamping installation 71 after clamping is positioned relative to the clamping installation 70 such that the threaded segment 35 and the toothed segment 61 by way of the joining faces 28 thereof bear on one another, the threaded segment 35 bears axially on the counter bearing 704, and the toothed segment 61 bears on the compression piece 714. Consequently, the overall spacing, the so-called start spacing L1, between the compression piece 714 and the counter bearing 704 is equal to the sum of the segment lengths Is and Iz, thus: L1=Is+Iz (length Is of the threaded segment 35+length Iz of the toothed segment 61).

The clamping installation 71 is set in rotation for friction welding according to the invention, such that the joining faces 28 rotate relative to one another under friction. The friction heat being released herein depends on the rotating speed and the contact pressure force F.

The contact pressure force F at the level of an initial friction force F1 is first exerted in order for initial friction to be performed, said initial friction force potentially being between 10 kN and 30 kN, for example. A homogenization of the surfaces of the joining faces 28 is performed on account thereof. Initial friction can be performed for a duration of less than 3 seconds.

The contact pressure force F is subsequently increased to an input force F2 in order for thermal input friction to be performed, said input force F2 potentially being approximately 5 to 12 times, preferably 6 to 11 times, the initial friction force F1. Thermal input friction is performed until the desired process temperature for welding steel has been reached at the joining faces 28. A fixed duration can be predefined herein, or time is regulated by way of the measured temperature. Durations of less than 15 seconds are preferably adhered to herein.

Upon reaching the process temperature, the contact pressure force F is increased to 10 to 20 times, preferably 17 times, the initial friction force F1. A compression is performed on account of the material melting between the joining faces 28 at the joint 27, the toothed segment 61 and the threaded segment 35 in said compression while the forming moving toward one another at the joint 27 such that the start length L1 is shortened. Only a defined shortening until a predefined target length L2 has been reached is permitted according to the path-controlled method according to the invention. The shortening is the so-called joining path X which corresponds to the difference between the start length L1 and the target length L2: X=L1−L2.

The final state in which the overall length L2 is reached is illustrated in FIG. 27. The target length L2 corresponds to the rack length Z of a rack 2 such as is shown in FIG. 2 or in FIG. 41, for example, wherein the shaft portion 24 has a shaft portion length S that on account of welding is shortened in relation to the segment length Is, and the toothed portion 21 has a toothed portion length V which is shorter than the segment length Iz.

Material has been squeezed out in a radial manner at the joint 27 when welding, said material forming an encircling welding bead 271.

Figure 28:
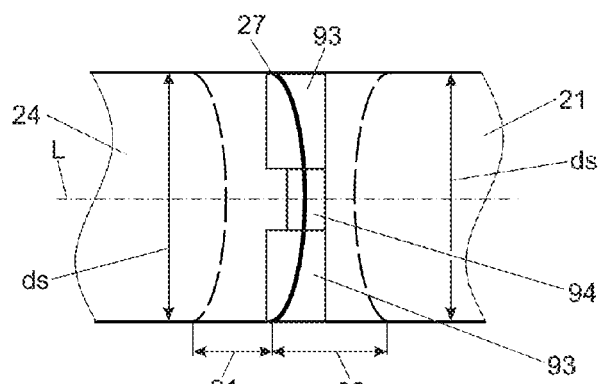
FIG. 28 is a schematic hardness profile of an example friction-welded connection.

A hardness profile which can be generated at the joint 27 by way of the friction welding according to the invention is schematically illustrated in FIG. 28. A thermal input that is relevant to modification of the structure of the steel is performed on account of the friction welding, said thermal input being in the direction of the longitudinal axis L into a heat influence zone 91 and 92 of the shaft portion 24, or of the toothed portion 21, respectively. The welding parameters such as rotating speed and contact pressure force F according to the invention are preferably defined such that the heat influence zones 91 and 92 are heated to at most 250° C. The heat influence zones 91 and 92 in the case of the method according to the invention preferably have a maximum width of 0.25×ds, wherein ds indicates the diameter of a segment 21 or 24, respectively.

The heating is most intense in the radially outward circumferential region in the direct proximity of the joint 27. A hardness increase in relation to the base material of at most 200 HV1 is permitted in this coaxially encircling peripheral region 93. A hardness increase of at most 250 HV1 is permitted for the core region 94 which is located centrally within the peripheral region 93. The forming of metallurgical notches is avoided and a higher load-bearing capability is achieved on account of the hardness increase being lower in the peripheral region 93 than in the core region 94.

A rack for a motor vehicle steering mechanism is advantageously implemented by the method management, said rack being formed from two segments, for example a toothed segment 61 or toothed segment 63 having a shaft segment 62, which are connected to one another by means of friction welding, wherein the maximum micro hardness in the longitudinal axis L, in a first spacing which measured from the center of the welding seam and which is larger than the segment diameter ds of the segment having the smaller diameter multiplied by 0.3, is greater by less than 200 HV1 as compared to the micro hardness in the longitudinal axis at a spacing of 1.5 times the segment diameter ds of the segment having the smaller diameter. The increase in the hardness is preferably less than 120 HV1.

It is particularly preferable herein for the maximum micro hardness in the surface in a spacing which is measured from the center of the welding seam and which is larger than the segment diameter ds of the segment having the smaller diameter multiplied by 0.3, is greater by less than 250 HV1 than the micro hardness in the surface at a spacing of 1.5 times the segment diameter ds of the respective segment. The increase in hardness is preferably less than 180 HV1.

Figure 29:
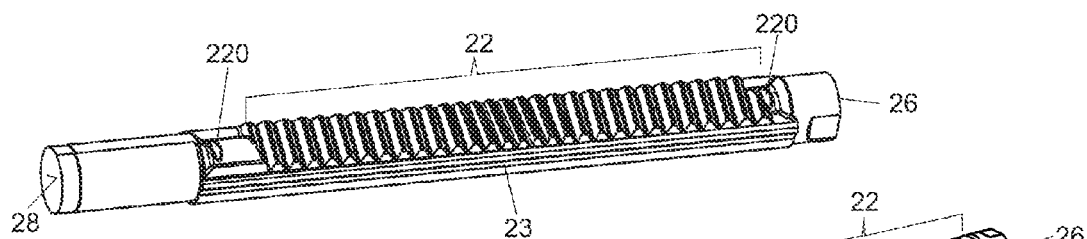
FIG. 29 is a perspective view of an example toothed segment.

FIG. 29 shows a toothed segment 61 in a perspective view. Said toothed segment 61 has positioning elements 220 which is disposed so as to be positionally and dimensionally accurate relative to the functional faces of the toothing 22, of the back 23, of the joining face 28 or the like. The positioning elements 220 can be conjointly shaped in a simple manner when forging the toothed segment 61. Furthermore, the positioning elements 220 can be configured as precise reference faces by suitable machining methods such as grinding, eroding, or the like, and in terms of the shape and the arrangement be optimized as clamping faces for clamping in a clamping device, for example of clamping elements that engage in the form-fitting manner such as the clamping elements 701, 702, 703, 711, 712, or 713 according to FIGS. 26 and 27.

Figure 30:
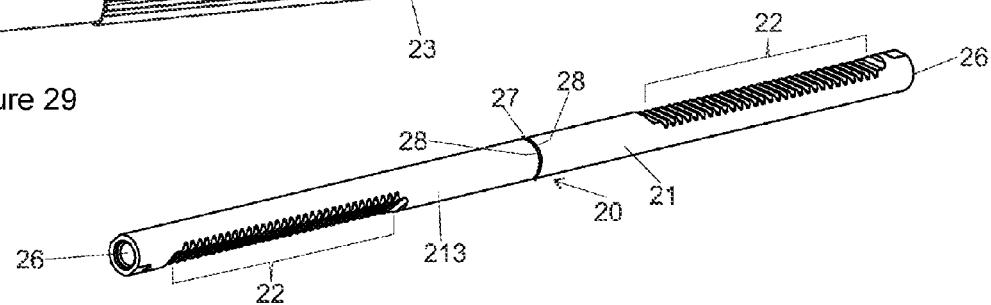
FIG. 30 is a perspective view of still another example constructed rack.

FIG. 30 shows an embodiment of a constructed rack 20 which has a toothed portion 21 and a second toothed portion 213 that as a shaft portion is connected to said toothed portion 21. The toothed portion 21 and the toothed portion 213 are connected at the joint 27 by means of friction welding. Both the toothed portion 21 as well as the toothed portion 213 have a toothing, said toothing having been incorporated by mechanical processing, for example by milling. It is likewise conceivable and possible for a toothed portion having a milled toothing to be connected to a forged toothed portion by means of friction welding.

Figure 36:
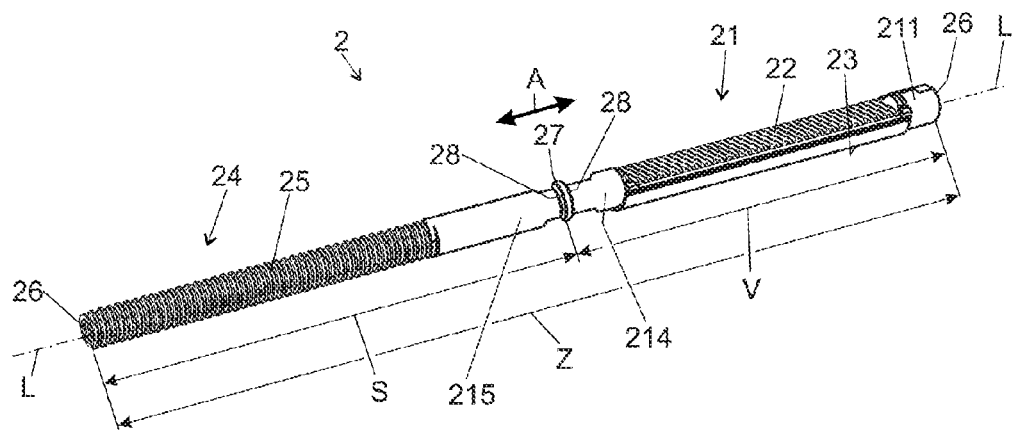
FIG. 36 is a perspective view of still another example rack.
Figure 37:
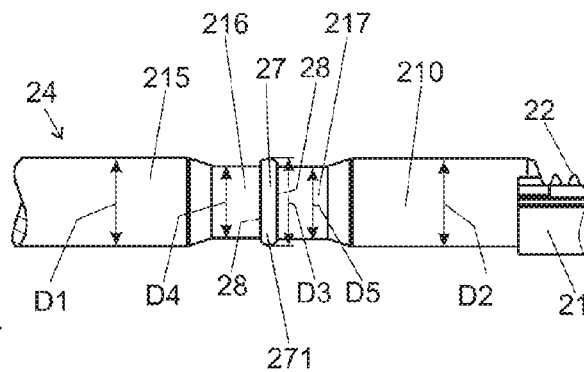
FIG. 37 is a schematic view of the example rack according to FIG. 36 in a direction of a width of a toothing, with the view being transverse to a longitudinal direction.

FIGS. 36 and 37 show a rack produced according to the invention in a further embodiment. The rack 2 has a toothed portion 21 which on one side is provided with a toothing 22 which extends in the longitudinal direction A. The rack 2 furthermore has a shaft portion 24 which in the example shown in FIG. 41 has a thread 25 and is also referred to as the threaded portion 24. The toothed portion 21 has a transition region 210 which at the free end of the transition portion 210 comprises a reduced diameter portion 217. The reduced diameter portion 214 has a smaller diameter D5 than the transition portion 210 having the diameter D2. The shaft portion 22 has a transition region 215 which at the free end of the transition portion 215 comprises a reduced diameter portion 216. The reduced diameter portion 216 has a smaller diameter D4 than the transition portion 216 having the diameter D1. The toothed portion 21 and the shaft portion 22, by way of the joining faces 28 thereof, at those ends of the reduced diameter portions 216, 217 thereof that face one another in the axial direction are connected to one another by friction welding in a joint 27. Material has been squeezed out in a radial manner at the joint 27 when welding, said material forming an encircling welding beads 271 having the envelope circle diameter D3. Said envelope circle diameter D3 of the welding bead 271 is smaller than the diameter D1 of the reduced diameter portion 216 and is smaller than the diameter D2 of the reduced diameter portion 214. The envelope circle diameter D3 is larger than the diameter D4 of the reduced diameter portion 216 and larger than the diameter D5 of the reduced diameter portion. Mechanical post-processing of the welding bead 217 is not required on account of the envelope circle diameter D3 being smaller than the diameter is D1, D2, since the welding bead 271 in a radially outward manner does not project further than the transition regions 210, 215.

Figure 38:
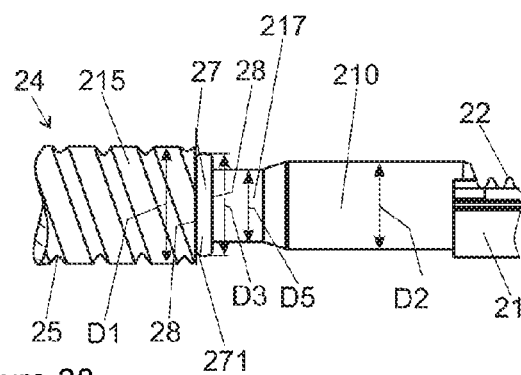
FIG. 38 is a schematic view of another example rack, similar to that of FIG. 37.

An alternative embodiment of a rack 2, similar to that of FIGS. 41 and 42, is illustrated in a detailed view in FIG. 38. The envelope circle diameter D3 is configured so as to be larger than the diameter D5 of the reduced diameter portion 217 and the diameter D2 of the transition portion 210. The envelope circle diameter D3 according to the invention is smaller than the diameter D1 of the transition region 215 of the shaft portion 24. The transition region 215 of the shaft portion 24 has the thread 25 which in this embodiment extends across the entire length of the shaft portion 24. The transition region thus represents the portion of the shaft portion that is adjacent to the joint 27. On account of the envelope circle diameter D3 of the welding bead 271 being smaller than the diameter D1 of the transition region 215, it can be achieved that the welding bead 271 does not project in an interfering radially outward manner and any additional subtractive machining of the welding bead 271 is not required since the welding bead 271 according to the invention in a radially outward manner does not project further than the transition region 215.

What is claimed is:

1. A method for forming a rack for a steering gear of a motor vehicle, wherein the rack includes a toothed portion that has a toothing that extends along a longitudinal axis, and a back that is generally cylinder-segment-shaped, the back lying opposite the toothing, the method comprising:
    positioning a cylindrical blank with an initial radius in a cavity of a die that is split in a separation plane parallel with the longitudinal axis, the die comprising a toothed die part having a toothed mold clearance configured to form the toothing and a back die part having a back mold clearance configured to form the back, with the back die part having a generally cylinder-segment-shape defining a back radius;
    wherein the toothed mold clearance and the back mold clearance are mutually spaced apart relative to the separation plane;
    moving the toothed die part and the back die part in a forging stroke for closing the cavity in a closing direction to a closed position; and
    forming the rack such that the toothing has a width that is greater than twice the initial radius of the blank and such that a back width of the rack produced by the forging stroke is greater than twice the initial radius of the cylindrical blank, with the back width being measured at the back of the rack, opposite the toothing, and being measured exclusive of any burrs.

2. The method of claim 1 wherein the back is D-shaped in cross section.

3. The method of claim 1 wherein the back is V-shaped in cross section in which V-shaped leg faces form secants of an envelope circle.

4. The method of claim 1 wherein a toothing width of the toothed die part, as measured transversely to the longitudinal axis, is larger than the unmachined radius of the cylindrical blank.

5. The method of claim 1 comprising holding in a holding installation a transition portion of the cylindrical blank in a manner neighboring the toothed die part and the back die part.

6. The method of claim 1 wherein a back axis in a toothed region when forming is radially offset relative to the longitudinal axis, in a direction toward the back, by a spacing.

7. The method of claim 1 wherein the cylindrical blank is a rod portion.

8. The method of claim 1 wherein the cylindrical blank is a tubular portion.

9. The method of claim 1 comprising machining the cylindrical blank so as to configure a shaft portion that in a direction of the longitudinal axis adjoins the toothed portion in an integral manner.

10. The method of claim 1 comprising forming the toothed portion on a toothed segment that is connected to a functional segment.

* * * * *